March 14, 1950      J. C. HEWITT, JR      2,500,410
INSTRUMENT FLOAT
Filed Sept. 16, 1947

John C. Hewitt Jr
INVENTOR.
BY
ATTORNEY

Patented Mar. 14, 1950

2,500,410

UNITED STATES PATENT OFFICE 2,500,410

INSTRUMENT FLOAT

John C. Hewitt, Jr., Long Beach, Calif.

Application September 16, 1947, Serial No. 774,390

11 Claims. (Cl. 33—206)

This relates to improvements having to do with the control of liquid-carried floats, the invention being primarily concerned with the assured maintenance of the float in an entirely free condition for whatever function, movement or control the float may be used, and being generally applicable therefore to any of various types of instruments employing floats. Merely as illustrative, the invention will be described with reference to compass floats.

As is well known, constant endeavor has been made to attain maximum freedom of the float for movement in the liquid, with the ultimate objective of achieving corresponding sensitivity in those parts of the instrument influenced or controlled by the float. Notwithstanding the use of various expedients such as low friction guides and the like, no completely satisfactory proposal has been advanced, insofar as I am aware, that will assure complete freedom of the float under all conditions to which the instrument may be subjected.

The present invention is believed to mark the first instance affording an assured solution of the problem and in a manner reducing the requirements to a minimum. In this respect, the invention is characterized by the fact that its results are accomplished by proper relationship of the float, its container and the liquid, to the complete exclusion of guides or other parts.

Briefly, the invention is predicated upon utilization of the liquid meniscus at the container wall surface to serve essentially as a barrier or buffer film restraining the float against contact with the container and if desired, maintaining the float accurately centered in the liquid chamber. Specifically, the liquid is caused to form with its chamber wall an annular meniscus, the curvature of which may be increased by correspondingly shaping the chamber wall, as by giving it a spherical surface at least at the location of the meniscus.

In accordance with the invention, the liquid meniscus is used as a barrier normally maintaining the float against engagement with its chamber wall, and preferably in centered relation within the chamber, by virtue of the float being so positioned as to engage the outside or convex side of the meniscus. Thus, where the meniscus has an upward curvature adjacent the chamber wall, the float is so maintained in the liquid as to be engageable against the under and convex side of the meniscus. Typically I employ a circular float in a circular chamber containing a liquid, the specific gravity of which is slightly greater than the float, so that a submerged upstanding rim portion of the float tends to thrust up against the meniscus in such relation that any tendency for displacement of the float against one side of the chamber wall, is resisted by the rim engagement with the meniscus at the opposite side of the chamber.

The invention has various additional features and objects, all of which together with the details of certain illustrative embodiments, will be understood to better advantage from the following description of the accompanying drawing, in which.

Figure 1:
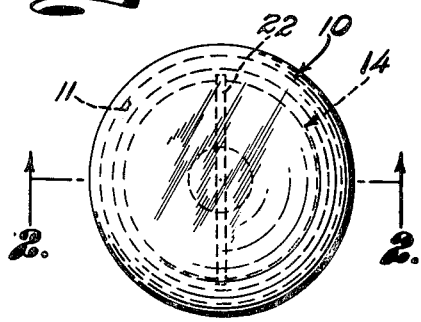
Fig. 1 is a plan view of the container and float.
Figure 2:
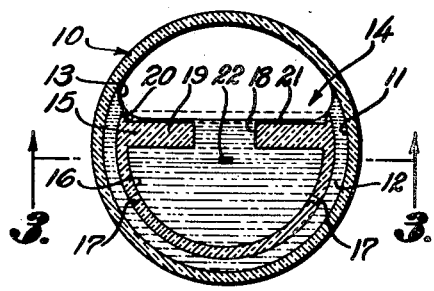
Fig. 2 is a vertical section on line 2—2 of Fig. 1.
Figure 3:
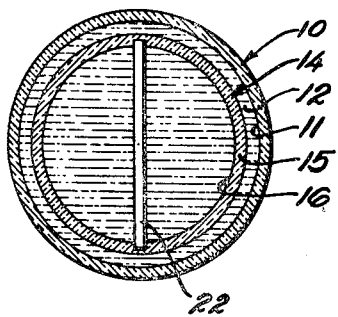
Fig. 3 is a cross-section on line 3—3 of Fig. 2.

As used typically for a compass, the container 10 may be formed of a transparent liquid wettable material such as glass or clear organic plastic, having an inner surface 11 circular in horizontal cross-section. The container is partly filled with liquid 12 to a level somewhat above the equator of the container, the liquid forming by reason of its surface tension an annular upwardly curved meniscus 13 at the wall surface 11. In order that the meniscus curvature may be increased for most effective confinement of the float, the container surface 11 preferably is given a spherical shape throughout, or at least a segmental spherical curvature at the location of the meniscus.

The float, generally indicated at 14, is shown typically to comprise a hollow body 15 having the later described specific gravity relationship to the liquid, and being generally hemispherical in shape. Displacement of liquid into and out of the hollow interior 16 of the float is permitted through apertures 17 and a central opening 18 in the top wall 19 of the float. The latter has an upstanding annular narrow rim 20 projecting at and above the outside of the float surface 21 to have the illustrated relation with the meniscus 13. When the instrument is to be used as a compass, the float may carry a magnetized element such as a bar or needle 22 terminating in the wall of the float. As will be understood without necessity for specific illustration, the float and container may carry suitable graduations and lettering indicative of the float orientation within the container.

To cite a specific construction as illustrative, the container 10 may have an internal diameter of 1 1/16 inches, and the float a diameter of one inch. A suitable liquid, such as perchlorethylene, having a specific gravity of about 1.6, may stand at a level approximately one-eighth inch above the equator of the container. The float may be made of any suitable material, such as a clear organic plastic, wettable by the liquid and having a specific gravity of about 1.3 to 1.4. As illustrative of suitable plastic materials are the phenolic condensation product type resins, e. g. those known commercially as "Bakelite" resins, manufactured by the Bakelite Corporation of America, and specifically its clear transparent Bakelite resin known and sold commercially as class IIC special purchase cast resin B. T.–61–893 series, having a specific gravity of approximately 1.40. In addition to the designated Bakelite resin, I have also successfully used "nylon" commercial stock resin, a product of the Dupont Company, and specifically its "nylon" commercial stock identified and sold to the trade as "FM–10,001" (formerly F. M.–1). The float may be made of either of these resins, the container or chamber of the same material or glass, and the liquid may consist of perchlorethylene.

Figure 4:
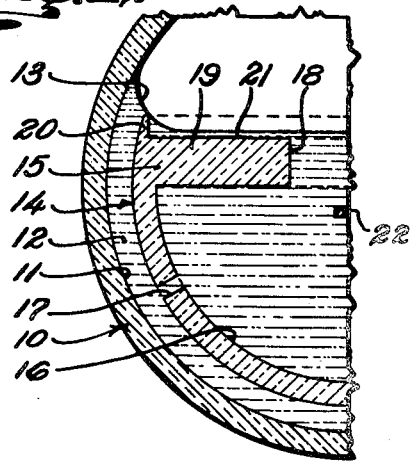
Fig. 4 is a fragmentary enlarged view illustrating the relationship of the float rim and liquid meniscus.

It will be observed that though of lesser specific gravity than the liquid, the float is maintained by reason of the surface tension of the liquid, submerged in the liquid, the latter filming the float surface 21 and the meniscus 13 curving outwardly and above the float rim 20. As illustrated, the float rim surrounds the meniscus, and by accurate measurement of the quantity of liquid filled into the container, is caused to engage the curved extent of the meniscus, see Fig. 4, so that the latter both centers and confines the float against lateral displacement. Thus the meniscus curvature and surface tension of the liquid establish an annular barrier or a buffer assuring maintenance of the float in centered position within the chamber, while otherwise permitting the float complete freedom of movement in the liquid.

I claim:

1. The combination comprising a liquid-contacted wall, a liquid forming a meniscus adjacent and curved upwardly toward said wall, and a float freely carried by and submerged in the liquid, said float having an upwardly extending surface engageable against the under convex side of the meniscus so that the meniscus presents a barrier to movement of the float relative to the wall.

2. The combination comprising a liquid-contacted wall, a liquid forming a meniscus adjacent and curved upwardly toward said wall, and a float freely carried by and submerged in the liquid, said float having an upwardly extending surface engageable against the under convex side of the meniscus so that the meniscus presents a barrier to movement of the float relative to the wall, said float containing an opening entered by the liquid and extending through the top of the float.

3. The combination comprising a container having a liquid-contacted wall, a liquid in the container and forming an upwardly curved meniscus adjacent said wall, and a float freely carried by the liquid and having an upwardly projecting portion submerged in the liquid and engaged against the under convex side of the meniscus so that the meniscus presents a barrier to movement of the float relative to the wall.

4. The combination comprising a container, a liquid in the container and forming a meniscus adjacent and curved upwardly and outwardly toward the wall thereof, and a circular float freely carried by the liquid having an outer annular rim completely submerged in the liquid at the outside of the meniscus so that the rim engages against the under convex side of the meniscus and the meniscus presents a barrier to movement of the float against the container wall.

5. The combination comprising a container, a liquid in the container and forming a meniscus adjacent and curved upwardly toward the wall thereof, and a circular float freely carried by the liquid having an upstanding top annular rim completely submerged in the liquid at the outside of the meniscus so that the rim engages against the under convex side of the meniscus and the meniscus presents a barrier to movement of the float against the container wall, said float containing an opening entered by the liquid and extending through the top of the float at the inside of said rim.

6. The combination comprising a container, a liquid in the container and forming a meniscus adjacent and curved upwardly toward the wall thereof, and a float freely carried by and submerged in the liquid, said float having an upwardly extending surface submerged in the liquid and engageable against the outer convex side of the meniscus so that the meniscus presents a barrier to movement of the float against the container wall, said float having a specific gravity slightly less than the specific gravity of the liquid.

7. The combination comprising a container having an inside wall surface of circular horizontal cross-section, a liquid partly filling the container and forming a meniscus adjacent and curved upwardly toward the wall thereof, there being a gas space in the container above the liquid, and a circular float freely carried by the liquid having an upstanding top annular rim completely submerged in the liquid at the outside of the meniscus so that the rim engages against the under convex side of the meniscus and the meniscus presents a barrier to movement of the float against the container wall, said float having a specific gravity slightly less than the specific gravity of the liquid.

8. The combination comprising a container having an inside wall surface of circular horizontal cross-section, a liquid partly filling the container and forming a meniscus adjacent and curved upwardly toward the wall thereof, there being a gas space in the container above the liquid, and a circular float freely carried by the liquid having an upstanding top annular rim completely submerged in the liquid at the outside of the meniscus so that the rim engages against the under convex side of the meniscus and the meniscus presents a barrier to movement of the float against the container wall, said float having a specific gravity slightly less than the specific gravity of the liquid and the float containing an opening entered by the liquid and extending through the top radial center of the float.

9. The combination comprising a container having a substantially spherical inside surface, a liquid in the container and forming above its horizontal equator a meniscus adjacent and curved upwardly toward the container wall, a segmental spherical hollow float freely carried by the liquid and having an upstanding top annular rim completely submerged in the liquid at the outside of the meniscus so that the rim engages against the under convex side of the meniscus and the meniscus presents a barrier to movement of the float against the container wall, said float having a top wall below and at the inside of said rim and an opening in said wall communicating with the liquid-containing interior of the float.

10. The combination comprising a liquid-contacted wall, a liquid forming a meniscus adjacent and curved concavely upwardly toward said wall, and a float freely carried by said liquid and having an upstanding projection spaced from said wall and submerged in the liquid at the location of the meniscus so that the meniscus extends upwardly from the top of said projection to the surface of said wall.

11. The combination comprising a circular liquid-contacted wall, a liquid forming an annular meniscus adjacent and curved concavely upwardly toward said wall, and a float freely floated by said liquid and carrying an upstanding annular rim having a narrow top edge submerged in the liquid at the location of the meniscus so that the meniscus extends upwardly from said edge to the surface of said wall.

JOHN C. HEWITT, Jr.

REFERENCES CITED

The following references are of record in the file of this patent:

UNITED STATES PATENTS

| Number | Name | Date |
|---|---|---|
| 1,294,710 | Roland | Feb. 18, 1919 |
| 1,912,358 | Bush | June 6, 1933 |
| 2,432,875 | Flint | Dec. 16, 1947 |